US011347318B2

(12) United States Patent
Kwak et al.

(10) Patent No.: US 11,347,318 B2
(45) Date of Patent: May 31, 2022

(54) SENSOR FOR RECOGNIZING HAND GESTURE AND SENSOR ARRAY USING SAME

(71) Applicant: KOREA ELECTRONICS TECHNOLOGY INSTITUTE, Seongnam-si (KR)

(72) Inventors: Yeon Hwa Kwak, Seoul (KR); Kun Nyun Kim, Yongin-si (KR); Won Hyo Kim, Yongin-si (KR)

(73) Assignee: Korea Electronics Technology Institute, Seongnam-si (KR)

(*) Notice: Subject to any disclaimer, the term of this patent is extended or adjusted under 35 U.S.C. 154(b) by 121 days.

(21) Appl. No.: 16/872,708

(22) Filed: May 12, 2020

(65) Prior Publication Data

US 2020/0272241 A1 Aug. 27, 2020

Related U.S. Application Data

(63) Continuation of application No. PCT/KR2018/014285, filed on Nov. 20, 2018.

(30) Foreign Application Priority Data

Nov. 24, 2017 (KR) .................. 10-2017-0158649

(51) Int. Cl.
*G06F 1/16* (2006.01)
*G06F 3/01* (2006.01)
*G01L 1/22* (2006.01)

(52) U.S. Cl.
CPC ............... *G06F 3/017* (2013.01); *G01L 1/22* (2013.01); *G06F 3/014* (2013.01)

(58) Field of Classification Search
None
See application file for complete search history.

(56) References Cited

U.S. PATENT DOCUMENTS

| 2010/0302137 | A1  | 12/2010 | Benko et al. |
| 2012/0212340 | A1  | 8/2012  | Kruse et al. |
| 2014/0007700 | A1* | 1/2014  | Lim ............. G01L 5/1627 702/41 |
| 2014/0238153 | A1  | 8/2014  | Wood et al. |
| 2016/0284971 | A1* | 9/2016  | Hong ............ G06F 1/163 |

FOREIGN PATENT DOCUMENTS

| KR | 10-2016-0037390 A | 4/2016 |
| WO | WO 2014/204323 A1 | 12/2014 |
| WO | WO 2016/044251 A1 | 3/2016 |

OTHER PUBLICATIONS

International Search Report dated Feb. 27, 2019 in International Application No. PCT/KR2018/014285, in 4 pages.

* cited by examiner

*Primary Examiner* — Carl Adams
(74) *Attorney, Agent, or Firm* — Knobbe Martens Olson & Bear LLP

(57) ABSTRACT

The described technology relates to a hand gesture recognition sensor. In one aspect, the hand gesture recognition sensor includes at least one strain unit configured to measure a physical change in an epidermis of a human body. The hand gesture recognition sensor also includes at least one bump unit located in a measurement direction of the at least one strain unit so as not to overlap the at least one strain unit, the at least one bump unit configured to amplify the physical change.

4 Claims, 9 Drawing Sheets

SENSOR FOR RECOGNIZING HAND GESTURE AND SENSOR ARRAY USING SAME

CROSS REFERENCE TO RELATED APPLICATIONS

This is a continuation application of International Patent Application No. PCT/KR2018/014285, filed on Nov. 20, 2018, which claims priority to Korean Patent Application No. 10-2017-0158649 filed on Nov. 24, 2017, the contents of both of which are incorporated herein by reference in their entireties.

BACKGROUND

Technical Field

The described technology generally relates to a sensor for recognizing a hand gesture and a sensor layer using the same.

Description of Related Technology

With the development of IT technology, the field of wearable devices that are placed on a human body to provide an information processing function has arisen, and research has been conducted on methods of inputting information into wearable devices. In addition to technology enabling a person to directly input a command using a touchscreen, gesture recognition technology for inputting information by recognizing a user's gesture has been researched.

As a method of recognizing a user's gesture, research has been conducted on a method of bringing a sensor into direct contact with a person's skin in order to capture an electrical signal transmitted to a muscle or to sense movement of an epidermis due to movement of a muscle.

SUMMARY

One aspect is a sensor for recognizing a hand gesture, which includes a strain unit configured to measure a physical change in an epidermis of a human body and a bump unit located beside the strain unit in a measurement direction of the strain unit and configured to amplify the physical change and transmit the same.

Another aspect is a sensor band using a sensor for recognizing a hand gesture, which includes a strain unit and a bump unit located in a measurement direction of the strain unit.

Another aspect is a hand gesture recognition sensor including at least one strain unit configured to measure a physical change in an epidermis of a human body, and at least one bump unit located in a measurement direction of the strain unit so as not to overlap the strain unit and configured to amplify the physical change.

In addition, the strain unit may include at least one serpentine portion having a bent portion, and the bump unit may be located in a measurement direction of the serpentine portion so as not to overlap the serpentine portion.

In addition, the strain unit may be configured such that measurement directions of at least two serpentine portions are perpendicular to each other and such that the at least two serpentine portions are connected in series to each other, and the bump unit may be located at the point at which the measurement directions of the two serpentine portions cross each other at right angles, and may be located so as not to overlap the two serpentine portions.

In addition, the strain unit may be configured such that multiple serpentine portions having the same measurement direction are connected in series to each other, and the bump unit may be located in the measurement direction of the multiple serpentine portions so as not to overlap the serpentine portions.

Another aspect is a sensor layer including a first base layer, a first sensor layer in which at least one strain unit formed on the first base layer to measure a physical change in an epidermis of a human body and an electrode pattern configured to transmit an electrical signal from the strain unit are formed, a first cover layer configured to cover the first sensor layer to protect the first sensor layer, and at least one bump unit located in a measurement direction of the strain unit so as not to overlap the strain unit and configured to amplify the physical change.

In addition, the sensor layer may further include a second base layer adhered to the bottom of the base layer, a second sensor layer formed under the second base layer and configured such that the strain unit and an electrode pattern are formed therein, and a second cover layer configured to cover the second sensor layer to protect the second sensor layer.

In addition, the sensor layer may further include at least one bump unit formed under the base layer and formed between the strain unit and another stain unit.

In addition, the strain unit may include at least one serpentine portion having a bent portion, and the bump unit may be located in a measurement direction of the serpentine portion so as not to overlap the serpentine portion.

The features and advantages of the described technology will be more clearly understood from the following detailed description taken in conjunction with the accompanying drawings.

It should be understood that the terms used in the specification and appended claims should not be construed as being limited to general and dictionary meanings, but should be construed based on meanings and concepts according to the spirit of the described technology on the basis of the principle that the inventor is permitted to define appropriate terms for the best explanation.

According to an embodiment of the described technology, when a physical change in an epidermis of a human body is measured, a bump unit located beside the strain unit in a measurement direction of the strain unit amplifies the physical change and transmits the same to the strain unit, thereby enabling measurement of a hand gesture with high sensitivity.

In addition, it is possible to recognize a hand gesture, which is input by a user, with high accuracy using a sensor band including multiple hand gesture recognition sensors, each of which includes a strain unit and a bump unit.

DETAILED DESCRIPTION

Figure 1:
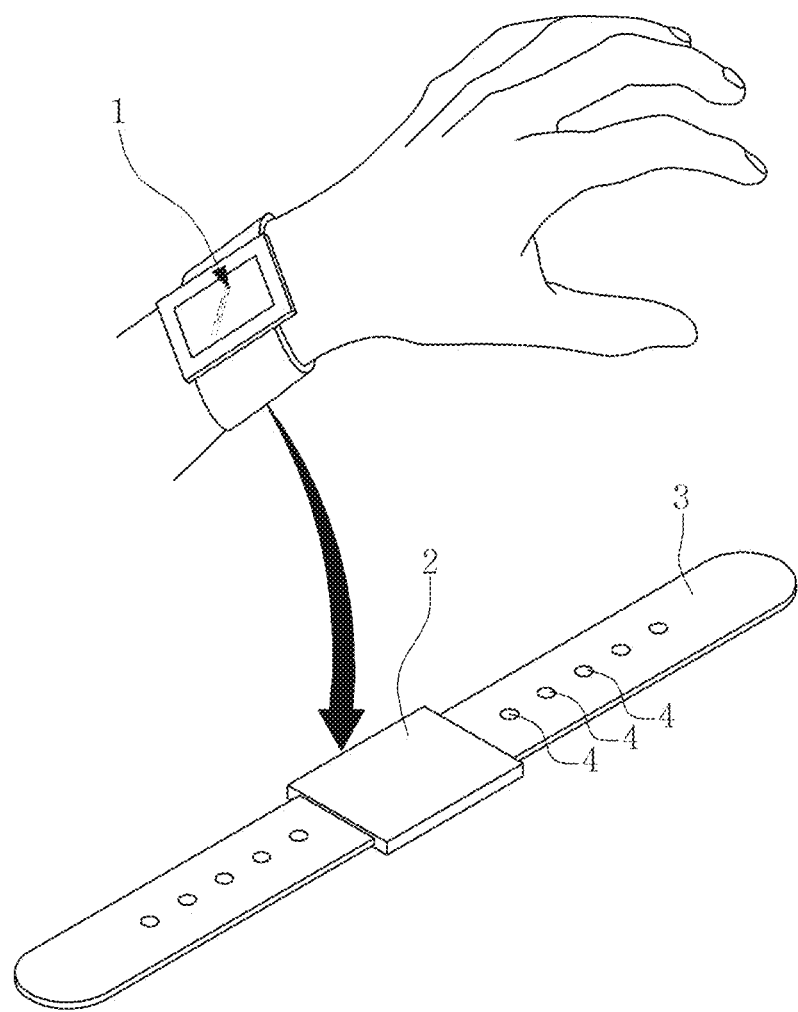
FIG. 1 is a conceptual diagram of a wearable device according to an embodiment of the described technology.

Objects, specific advantages, and novel features of an embodiment of the described technology will be apparent from exemplary embodiments and the following detailed description in connection with the accompanying drawings. It should be noted that when reference numerals are assigned to the elements of the drawings, the same reference numeral is assigned to the same elements even when they are illustrated in different drawings. Furthermore, the terms "one surface", "the other surface", "first", "second", etc. are only used to distinguish one element from another element, and these elements are not to be construed as being limited by these terms. In the following description of an embodiment of the described technology, a detailed description of known technology incorporated herein will be omitted when it may obscure the subject matter of an embodiment of the described technology.

Hereinafter, an embodiment of the described technology will be described in detail with reference to the accompanying drawings.

FIG. 1 is a conceptual diagram of a wearable device 1 according to an embodiment of the described technology.

As shown in FIG. 1, the wearable device 1 according to an embodiment of the described technology includes a main body 2, a band 3, and a hand gesture recognition sensor 4. The main body 2 includes a portable information processing device, which includes a display unit, a communication unit, a controller, and the like, and the band 3 is provided at a human-body contact surface thereof with the hand gesture recognition sensor 4, and is configured to be put on a user's body so as to surround the user's wrist or the like. When the user makes a predetermined gesture with the hand, the movement of musculoskeletal parts of the body, such as muscles, tendons, and ligaments, which move in order to make the gesture, may be transmitted to an epidermis, the hand gesture recognition sensor 4 may measure the physical change in the epidermis, and the main body 2 may recognize the gesture made by the user based on the signal generated by the hand gesture recognition sensor 4.

The band 3 includes a sensor layer 100 provided therein, and the sensor layer 100 includes a plurality of hand gesture recognition sensors 4. The number or positions of the hand gesture recognition sensors 4 included in the sensor layer 100 may be determined depending on the muscle distribution or the like of the human body on which the wearable device 1 is to be worn. Since the band 3 is formed to have a long and narrow shape so as to surround the human body, the band 3 is characterized in that it is easily deformed in the longitudinal direction thereof, in which it surrounds the human body, but it is not easily deformed in the width direction thereof.

With the structural characteristics of the band 3, the hand gesture recognition sensor 4, which is provided on the skin contact surface of the band 3, is required to have a structure suitable for improving recognition sensitivity and consequently improving a gesture recognition rate. The hand gesture recognition sensor 4 according to an embodiment of the present disclosure has an advantage of being put on the wrist, thus being capable of effectively recognizing the user's hand gesture.

Figure 2:
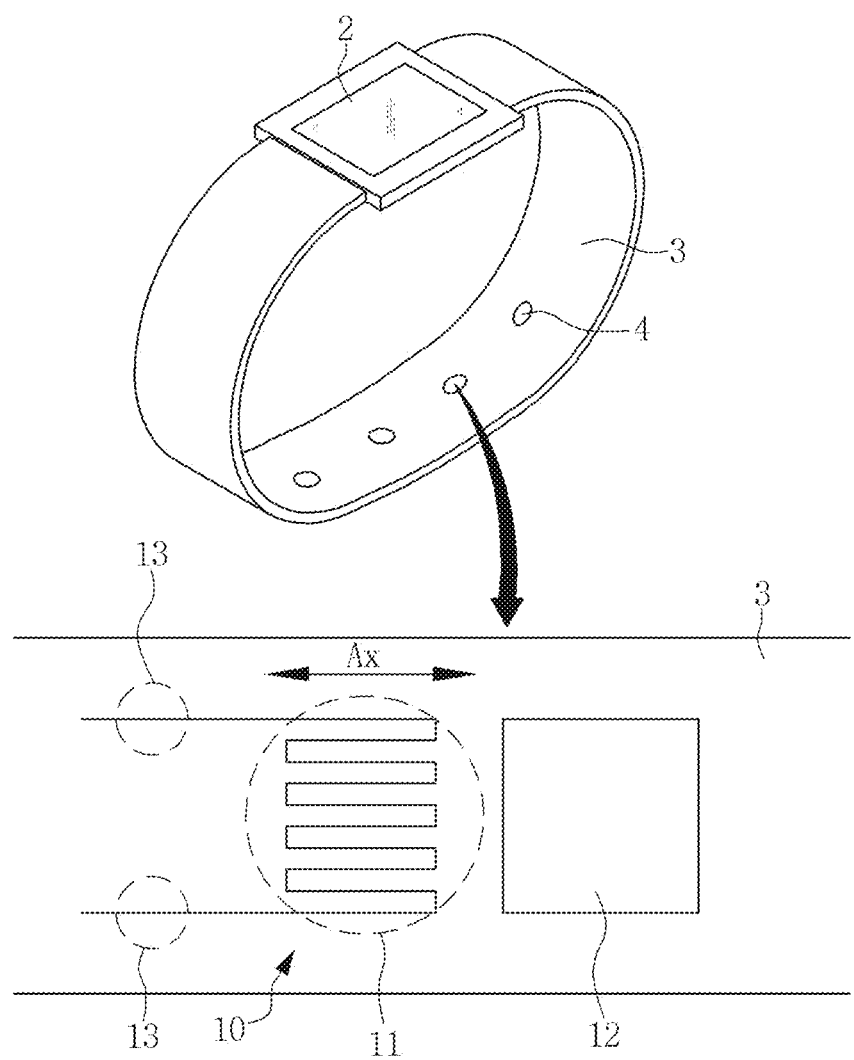
FIG. 2 is a view showing a hand gesture recognition sensor according to an embodiment of the described technology.

FIG. 2 is a view showing a hand gesture recognition sensor according to an embodiment of the described technology.

As shown in FIG. 2, a hand gesture recognition sensor according to an embodiment of the described technology includes at least one strain unit 10 for measuring a physical change in an epidermis of the human body, and at least one bump unit 12 located in a measurement direction Ax of the strain unit 10 so as not to overlap the strain unit 10 and configured to amplify the physical change.

The strain unit 10 includes a serpentine portion, which is formed of a metal material and is patterned in the form of a continuous "╤"-shaped line having a plurality of bent portions. Electrode patterns 13 are connected to both ends of the serpentine portion 11 to transmit a change in resistance due to deformation of the serpentine portion 11 in the measurement direction Ax. The strain unit 10 may be located such that the longitudinal direction of the band 3 of the wearable device 1 and the measurement direction Ax of the serpentine portion 11 are parallel to each other. Alternatively, as needed, the strain unit 10 may be located such that the longitudinal direction of the band 3 of the wearable device 1 and the measurement direction Ax of the serpentine portion 11 are perpendicular to each other or intersect each other obliquely at a predetermined angle.

As shown in FIG. 2, the bump unit 12 is spaced a predetermined distance apart from the side portion of the strain unit 10 in the measurement direction Ax of the strain unit 10 so that the strain unit 10 and the bump unit 12 do not overlap each other. More specifically, the bump unit 12 is spaced a predetermined distance apart from the side portion of the serpentine portion 11 of the strain unit 10 in the measurement direction Ax of the strain unit 10. The bump unit 12 may have an area corresponding to that of the serpentine portion 11, and may have a predetermined height.

That is, the strain unit 10 includes at least one serpentine portion 11 having a bent portion, and the bump unit 12 is located in the measurement direction Ax of the serpentine portion 11 so as not to overlap the serpentine portion 11. Owing to the sensor structure in which the bump unit 12 is located beside the strain unit 10 in the measurement direction Ax of the strain unit 10 so as not to overlap the strain unit 10, when the user makes a gesture, the physical change in the epidermis is transmitted to and concentrated on the bump, and thus the deformation of the strain unit 10 located in the band 3 of the wearable device 1 is amplified, thereby increasing the sensitivity of the sensor.

Figure 3A:
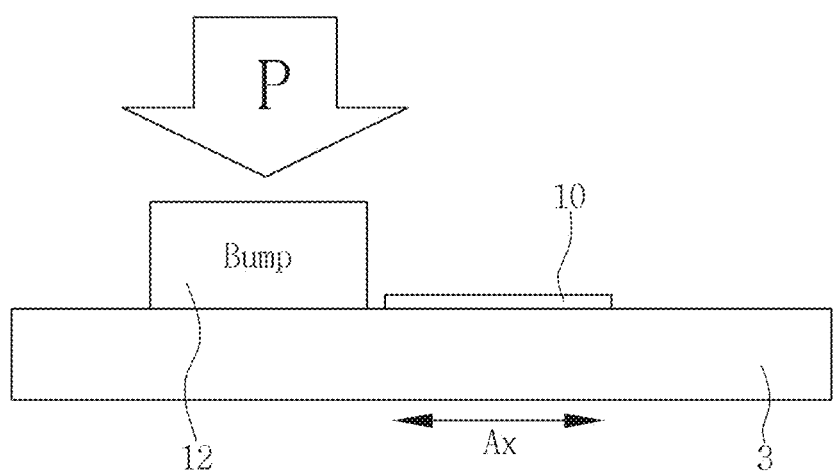
FIGS. 3A, 3B, 3C and 3D are diagrams showing experimentations on the performance of the hand gesture recognition sensor according to an embodiment of the described technology.
Figure 3B:
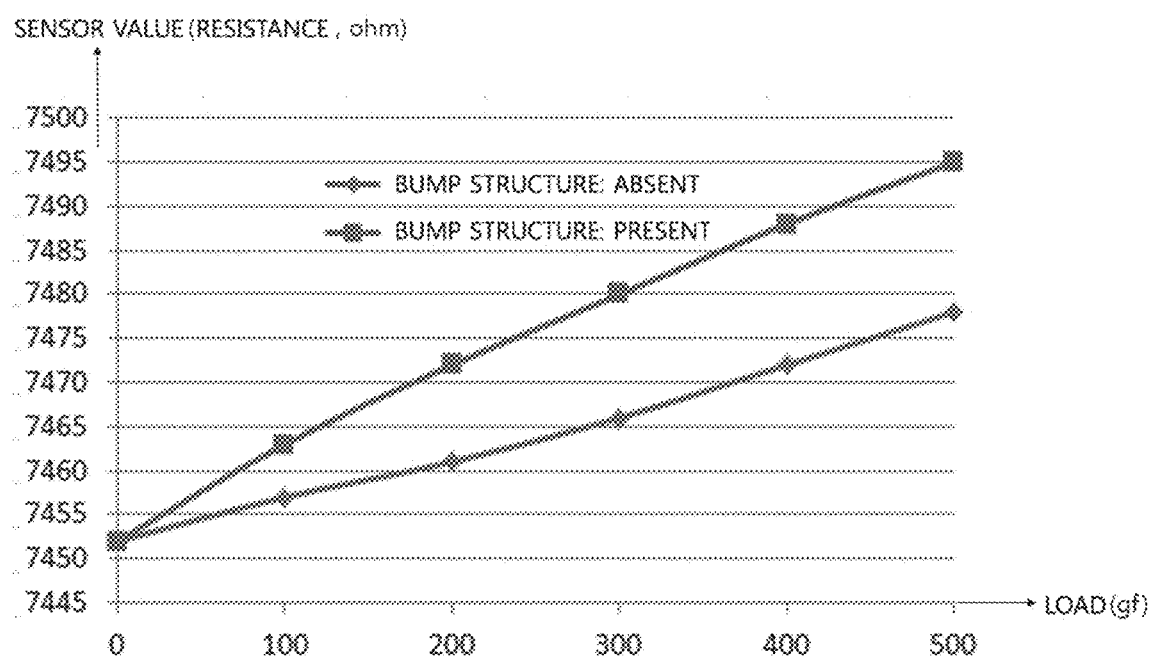

FIGS. 3A to 3D are diagrams showing experimentations on the performance of the hand gesture recognition sensor according to an embodiment of the described technology. FIG. 3A is a diagram showing the environment in which the structure of the hand gesture recognition sensor according to an embodiment of the described technology is tested, and FIG. 3B is a graph showing the experimental results of FIG. 3A.

As shown in FIG. 3A, in the state in which the strain unit 10 is placed on the band 3 and the bump is placed beside the strain unit 10 in the measurement direction Ax of the stain unit 10, when pressure P is applied to the bump, the strain unit 10 may be deformed, and accordingly, a change in resistance may be measured. As shown in FIG. 3B, it can be appreciated that when the bump unit 12 (bump structure) is absent, the inclination of the resistance value with respect to the pressure is low, and when the bump unit 12 (bump structure) is present, the inclination of the resistance value with respect to the pressure is high.

Figure 3C:
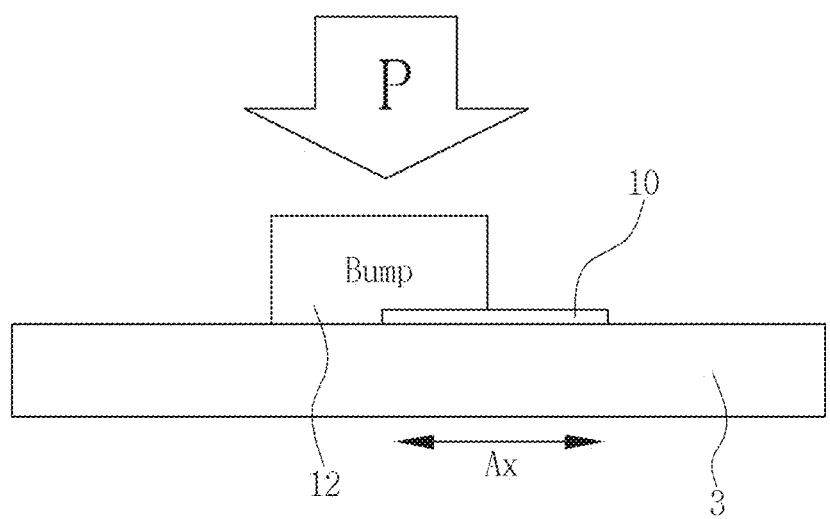
Figure 3D:
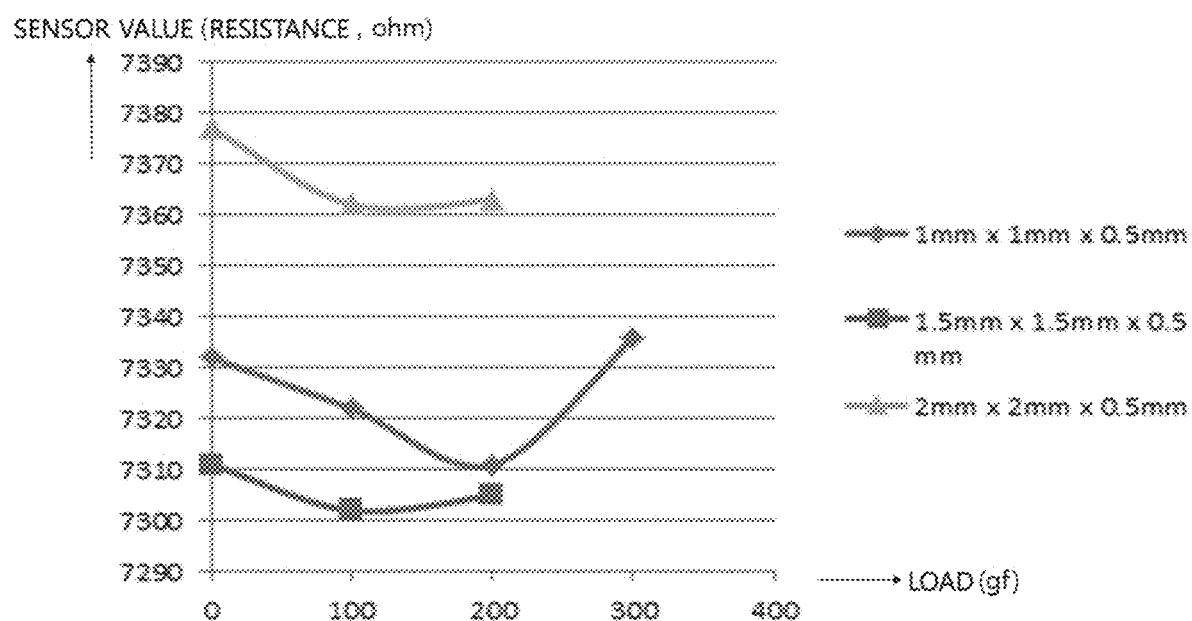

FIG. 3C is a diagram showing the environment in which the structure in which the strain unit 10 and at least a portion of the bump unit 12 overlap each other is tested, and FIG. 3D is a graph showing the experimental results of FIG. 3C.

As shown in FIG. 3C, in the state in which the strain unit 10 is placed on the band 3 and the bump is placed in the measurement direction Ax of the strain unit 10 such that the strain unit 10 and at least a portion of the bump unit 12 overlap each other, when pressure P is applied to the bump, the strain unit 10 may be deformed, and accordingly, a change in resistance may be measured. As shown in FIG. 3D, when the bump unit 12 covers at least a portion of the strain unit 10, the bump unit 12 directly transmits the physical change in an epidermis to the serpentine portion 11 of the strain unit 10, and thus the strain unit 10 is first compressed and then, at a certain level of force or higher, is extended, resulting in nonlinear resistance characteristics. The experiments were conducted using three types of bumps, which had sizes of 1 by 1 by 0.5 (mm), 1.5 by 1.5 by 0.5 (mm), and 2 by 2 by 0.5 (mm). In all of the cases, as shown in FIG. 3D, the measured resistance values exhibited nonlinear characteristics in which the resistance values decrease and then increase.

As such, it can be confirmed from FIGS. 3A and 3B that the variation in resistance with respect to the load applied to the strain unit 10 increases due to the presence of the bump unit 12. Thus, it can be appreciated that the sensitivity of the sensor increases when the bump unit 12 is located beside the strain unit 10 in the measurement direction Ax of the strain unit 10. In addition, it can be confirmed from FIGS. 3C and 3D that the output of the sensor is nonlinear when the bump unit 12 overlaps the strain unit 10, and these output characteristics are inappropriate for use as a sensor. Therefore, the bump unit 12 is spaced a predetermined distance apart from the strain unit 10 in order to secure the linearity of the sensor.

Figure 4A:
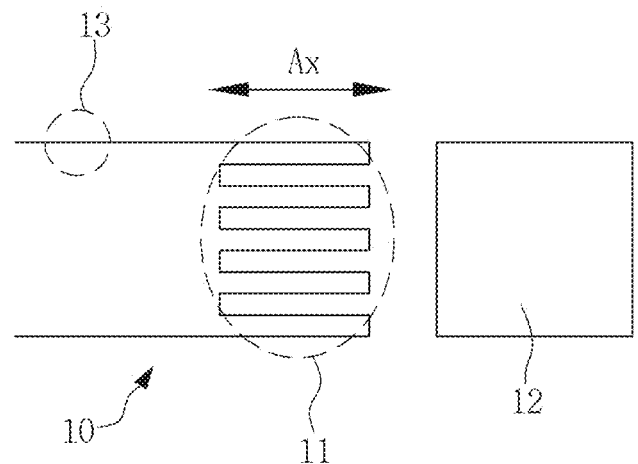
FIGS. 4A, 4B, 4C and 4D are diagrams showing the arrangement of a strain unit and a bump unit according to an embodiment of the described technology.

FIGS. 4A to 4D are diagrams showing the arrangement of the strain unit 10 and the bump unit 12 according to an embodiment of the described technology. Referring to FIG. 4A, the hand gesture recognition sensor 4 includes a strain unit 10 and a bump unit spaced a predetermined distance apart from the strain unit 10 in the measurement direction Ax of the strain unit 10. Although the bump unit 12 is illustrated as being disposed on the right side of the strain unit 10 in the measurement direction Ax of the strain unit 10, the bump unit 12 may be disposed on the left side in the measurement direction Ax.

Figure 4B:
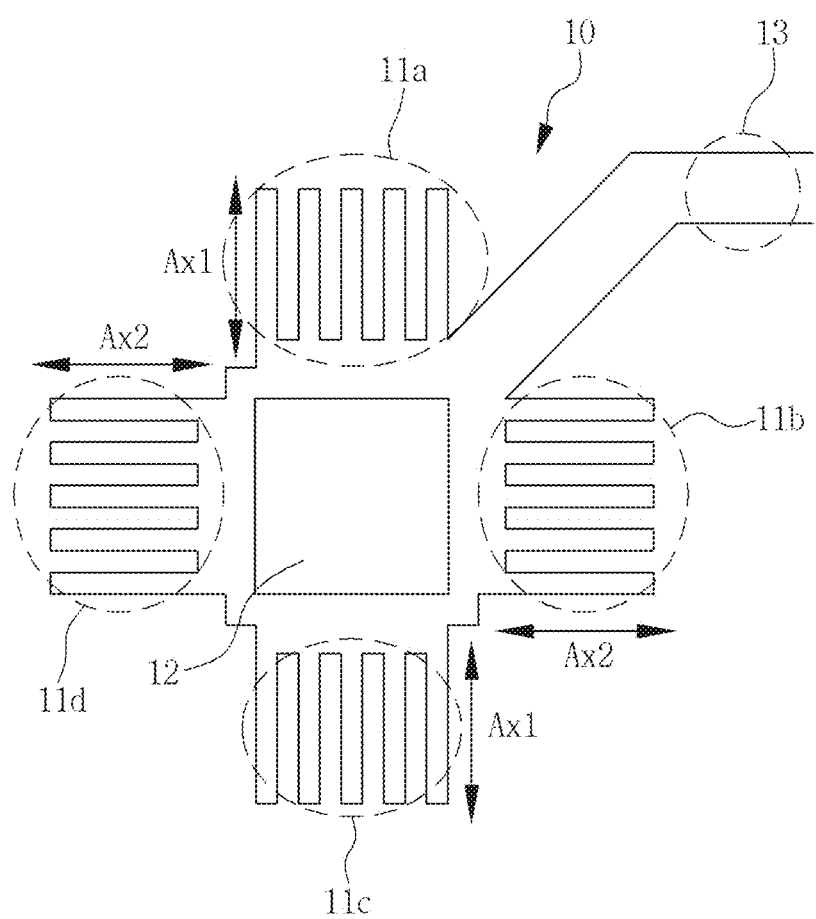

Referring to FIG. 4B, the hand gesture recognition sensor 4 includes a strain unit 10 and a bump unit 12. The strain unit 10 is configured such that the measurement directions Ax of at least two serpentine portions 11 are perpendicular to each other and such that the at least two serpentine portions 11 are connected in series to each other, and the bump unit 12 is located at the point at which the measurement directions Ax of the two serpentine portions 11 cross each other at right angles, and is located so as not to overlap the two serpentine portions 11.

FIG. 4B shows a hand gesture recognition sensor 4 having four serpentine portions 11. The first serpentine portion 11a and the third serpentine portion 11c are disposed parallel to each other in a first measurement direction Ax1, the second serpentine portion 11b and the fourth serpentine portion 11d are disposed parallel to each other in a second measurement direction Ax2 perpendicular to the first measurement direction Ax1, and the first to fourth serpentine portions 11a to 11d are connected in series to one another, thereby forming a single strain unit 10. The first measurement direction Ax1 may be oriented parallel to the width direction of the band 3 of the wearable device 1, and the second measurement direction Ax2 may be oriented parallel to the longitudinal direction of the band 3 of the wearable device 1.

The first to fourth serpentine portions 11 may be arranged in the form of a cross, and the bump unit 12 may be disposed at a middle position of the first to fourth serpentine portions 11a to 11d, at which the first measurement direction Ax1 and the second measurement direction Ax2 cross each other at right angles. The hand gesture recognition sensor 4 having this structure has an advantage of being capable of simultaneously measuring a change in the longitudinal direction of the band 3 of the wearable device 1 and a change in the width direction thereof according to the physical change in an epidermis. The experimental results of the hand gesture recognition sensor 4 having this arrangement will be described later with reference to FIGS. 5 and 6.

Figure 4C:
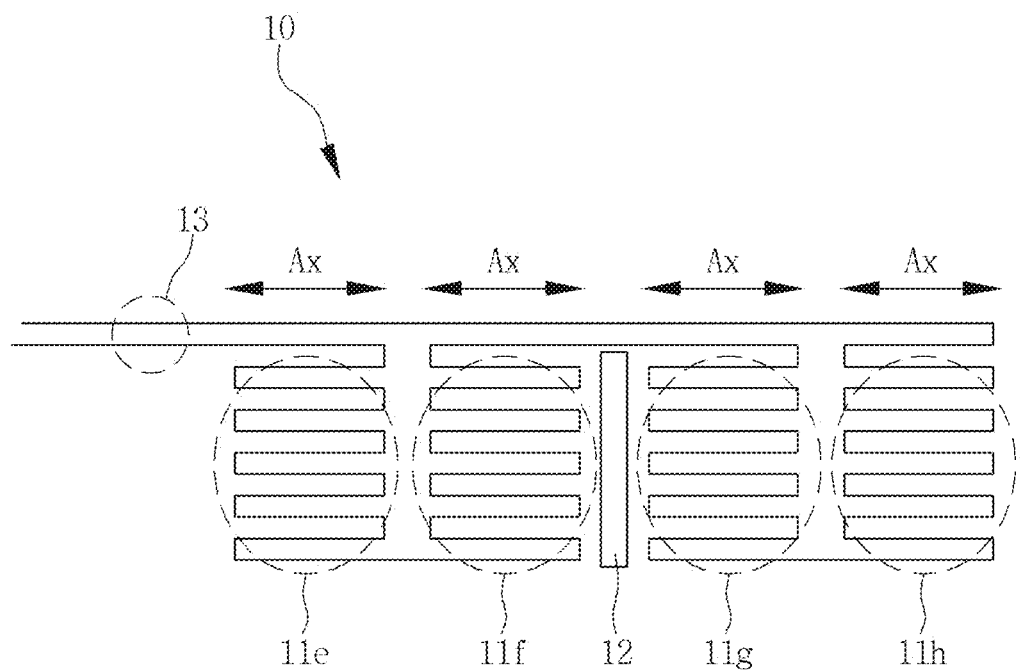
Figure 4D:
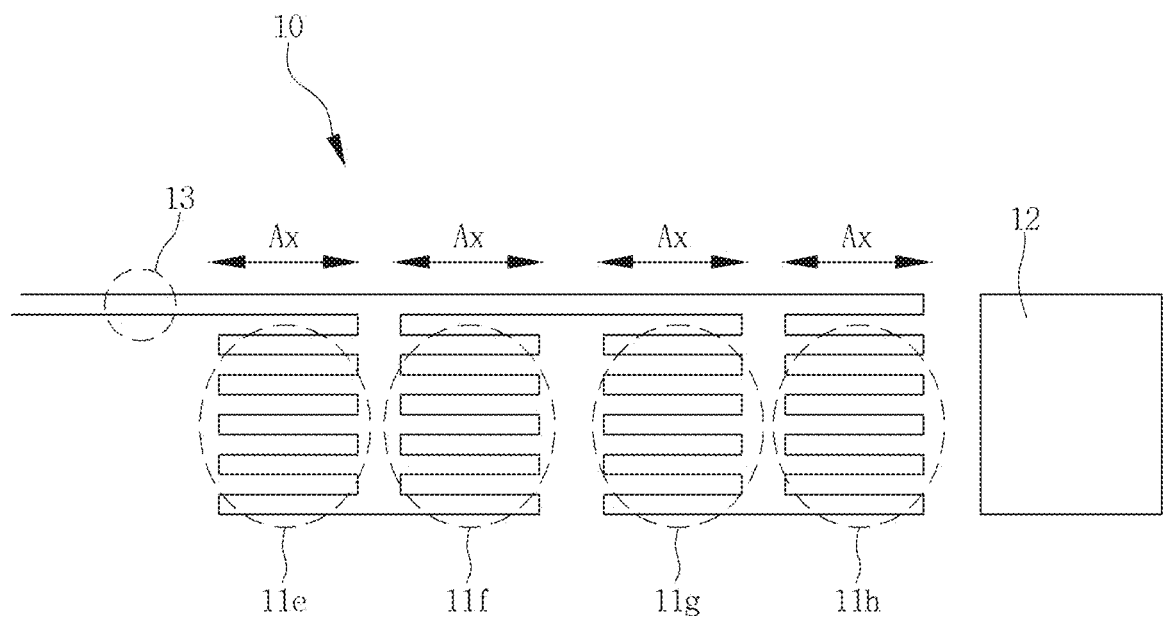

FIGS. 4C and 4D show a hand gesture recognition sensor 4 in which four serpentine portions 11 are arranged in one measurement direction Ax. As shown in FIG. 4C, the first to fourth serpentine portions 11e to 11h have the same measurement direction Ax, and the next serpentine portion 11f is disposed beside the serpentine portion 11e, adjacent thereto, in the measurement direction Ax. In addition, the first to fourth serpentine portions 11e to 11f are sequentially connected in series to one another. The measurement direction Ax of the strain unit 10 may be the same as the longitudinal direction of the band 3 of the wearable device 1. Since the area of epidermis that is capable of being measured by the strain unit 10 increases in the same direction as the longitudinal direction of the band 3, a gesture recognition rate increases.

As shown in FIG. 4C, the bump unit 12 may be disposed between the serpentine portions 11. The bump unit 12 is formed to have a sufficiently thin and long shape so as to be located between the serpentine portions 11e to 11f. As shown in FIG. 4D, the bump unit 12 may be disposed beside the serpentine portions 11e to 11f in the measurement direction Ax so as not to overlap the serpentine portions 11e to 11f, rather than between the serpentine portions 11e to 11f.

Figure 5:
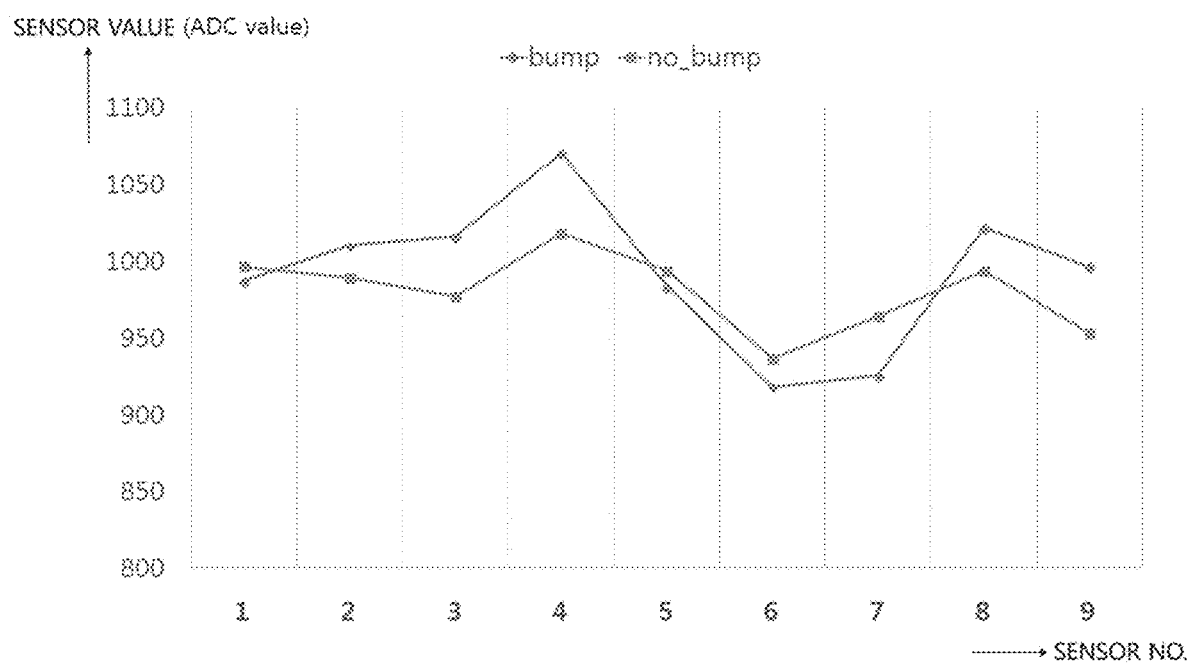
FIG. 5 is a diagram showing the experimental results on the performance of the hand gesture recognition sensor depending on the presence or absence of the bump in the embodiment shown in FIG. 4B.
Figure 6:
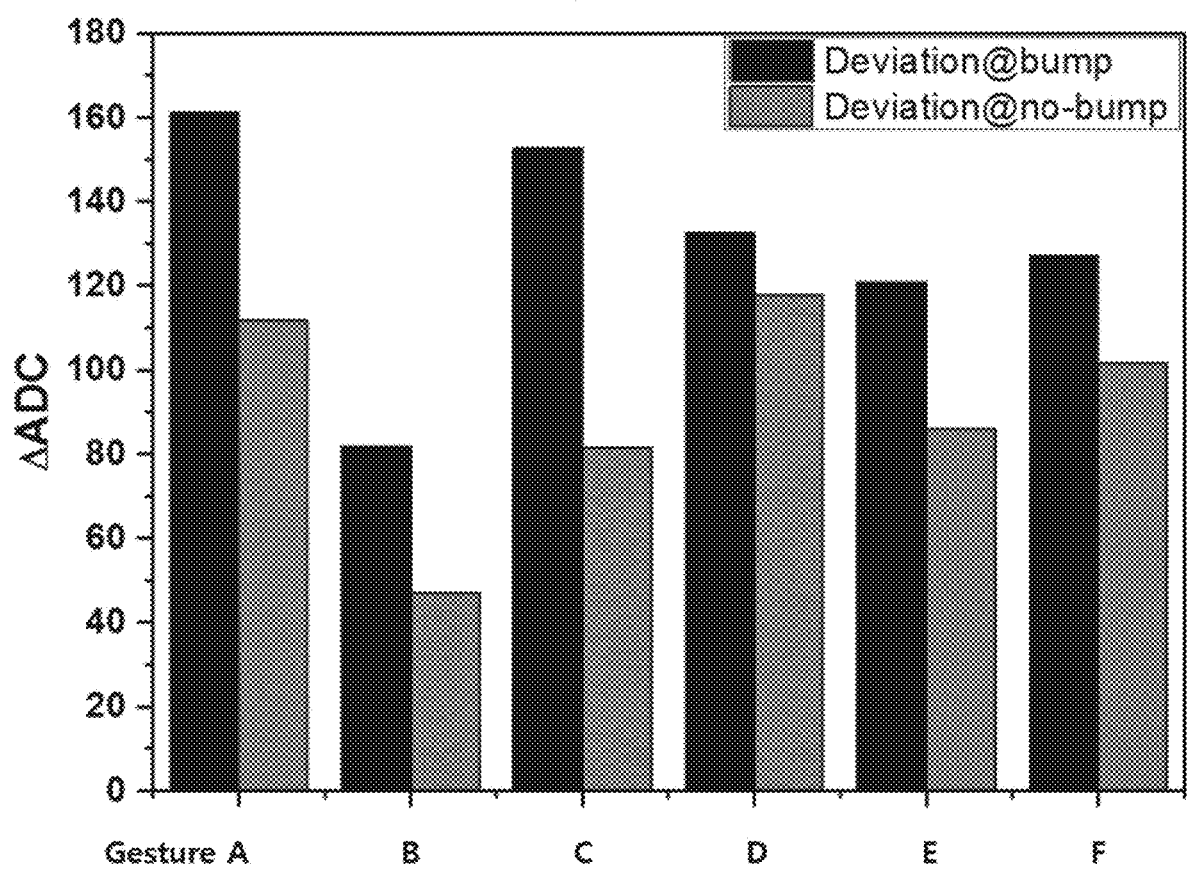
FIG. 6 is a diagram showing the experimental results on the performance of the hand gesture recognition sensor with respect to various gestures in the embodiment shown in FIG. 4B.

FIG. 5 is a diagram showing the experimental results on the performance of the hand gesture recognition sensor 4 depending on the presence or absence of the bump in the embodiment shown in FIG. 4B, and FIG. 6 is a diagram showing the experimental results on the performance of the hand gesture recognition sensor 4 with respect to various gestures in the embodiment shown in FIG. 4B.

FIG. 5 shows the values measured in the case in which the bump 12 is absent (no_bump) and the case in which the bump 12 is present (bump) when multiple sensors (sensor Nos. 1 to 9), each of which has the structure of the strain unit 10 of the hand gesture recognition sensor 4 according to the embodiment shown in FIG. 4B, are disposed on the wearable device 1 and a user makes a specific gesture of unfolding the palm.

In the specific gesture of unfolding the palm, when the bump 12 is absent (no_bump), the measured values increase from the first sensor to the fourth sensor, the measured values decrease from the fourth sensor to the sixth sensor, and the measured values increase to the eighth sensor. When measured values having this pattern are input, it can be recognized that the user inputs a gesture of unfolding the palm.

In this case, when the bump 12 is present (bump), the measured values increase from the first sensor to the fourth sensor such that the increase rate thereof is greater than that when the bump 12 is absent (no_bump), the measured values decrease from the fourth sensor to the sixth sensor such that the decrease rate thereof is greater than that when the bump 12 is absent (no_bump), and the measured values increase from the sixth sensor to the eighth sensor such that the increase rate thereof is greater than that when the bump 12 is absent (no_bump).

Therefore, in the sensor having the structure of the strain unit 10 according to the embodiment shown in FIG. 4B, when the bump 12 is present (bump), the specific sensor values obtained by the specific gesture (gesture of unfolding the palm) have a specific pattern (a graph in which the measured values increase from the first sensor to the fourth sensor, the measured values decrease from the fourth sensor to the sixth sensor, and the measured values increase from the sixth sensor to the eighth sensor) that is more prominent than that when the bump 12 is absent (no_bump), thus exhibiting an advantage of improving a gesture recognition rate.

FIG. 6 is a graph showing the difference between the output values obtained when the bump 12 is present (bump) and the difference between the output values obtained when the bump 12 is absent (no_bump) in the case in which various gestures are measured by the sensor having the structure of the strain unit 10 according to the embodiment shown in FIG. 4B. When six gestures (gestures A to F) are made, it can be appreciated that the difference between the output values obtained when the bump 12 is present (bump) is greater than that when the bump 12 is absent (no_bump). That is, it can be confirmed that it is possible not only to increase a gesture recognition rate with respect to a specific gesture but also to generally increase a recognition rate with respect to various gestures.

Figure 7A:
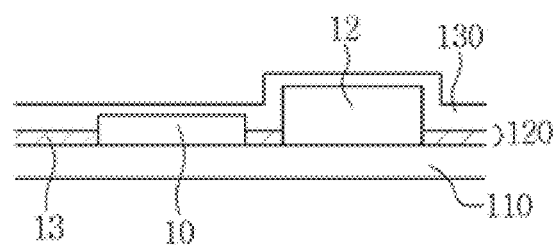
FIGS. 7A, 7B and 7C are views showing the cross-section of a sensor layer using a hand gesture recognition sensor according to an embodiment of the described technology.
Figure 7B:
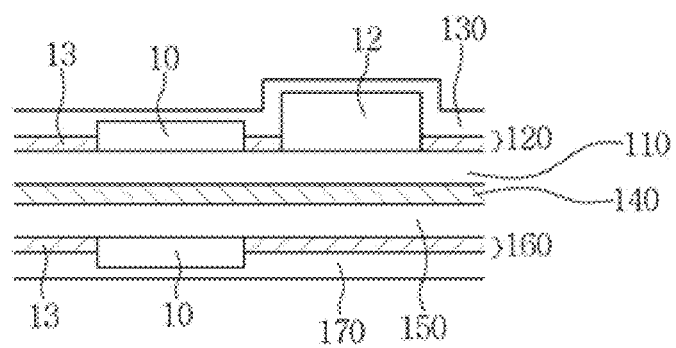
Figure 7C:
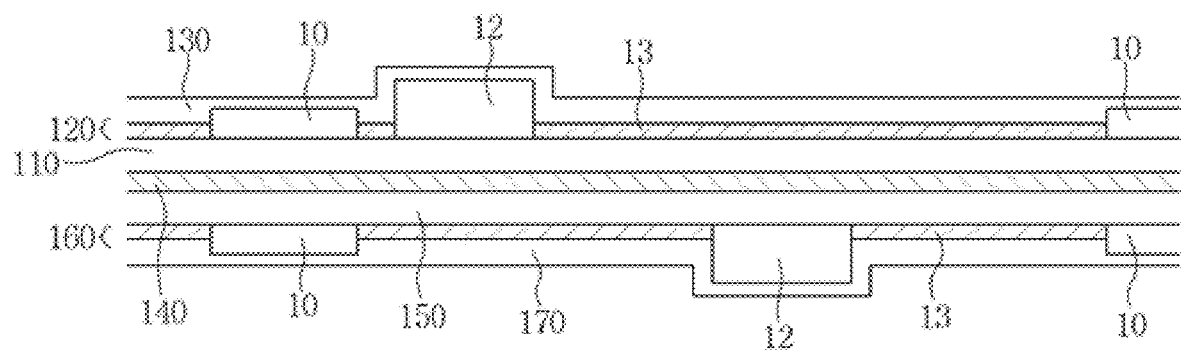

FIGS. 7A, 7B and 7C are views showing the cross-section of a sensor layer 100 using a hand gesture recognition sensor according to an embodiment of the described technology.

Referring to FIG. 7A, the sensor layer 100 using a hand gesture recognition sensor according to an embodiment of the described technology includes a first base layer 110, a first sensor layer 120, in which at least one strain unit 10 formed on the first base layer 110 to measure a physical change in an epidermis of a human body and an electrode pattern 13 for transmitting an electrical signal from the strain unit 10 are formed, a first cover layer 130, which covers the first sensor layer 120 to protect the same, and at least one bump unit 12, which is located in the measurement direction Ax of the strain unit 10 so as not to overlap the strain unit 10 and amplifies the physical change. The sensor layer 100, which includes the first base layer 110, the first sensor layer 120, and the first cover layer 130, may be formed in the shape of the band 3 that is long and narrow so as to be coupled to the band 3 of the wearable device 1.

The first base layer 110 functions as a base of the sensor layer 100 by supporting the strain unit 10, electrode wires, and the bump unit 12, which are included in the sensor layer. The base layer may be formed of a flexible material (e.g. polyimide (PI) or the like) that is capable of being bent by external force.

The first sensor layer 120 is located on the first base layer 110, and may be formed using a well-known method such as metal deposition or patterning. The first sensor layer 120 includes at least one strain unit 10, and includes an electrode pattern 13, which is electrically connected to each strain unit 10 to transmit an electrical signal. The strain unit 10 and the electrode pattern 13 may be formed of a conductive material such as copper (Cu) or aluminum (Al).

The first cover layer 130 is formed to cover the first sensor layer 120 to protect the same. The first cover layer 130 may insulate the strain unit 10 and the electrode pattern 13 so that the strain unit 10 and the electrode pattern 13 are not short-circuited therebetween, and may insulate the first sensor layer 120 in order to protect the strain unit 10 and the electrode pattern 13 from the external environment. The sensor layer 100 may further include a separate layer such as a shielding layer as needed, in addition to the base layer, the sensor layer, and the cover layer.

The bump unit 12 is spaced a predetermined distance apart from the side portion of the strain unit 10 in the measurement direction Ax of the strain unit 10. The bump unit 12 may be placed after the first sensor layer 120 is formed, whereby the bump unit 12 may be disposed between the first base layer 110 and the first cover layer 130. Alternatively, the bump unit 12 may be coupled to the top surface of the first cover layer 130.

The sensor layer 100 having this structure may be coupled to the band 3 of the wearable device 1, and may measure movement of a muscle related to the gesture made by a user with high sensitivity.

As shown in FIG. 7B, the sensor layer 100 according to an embodiment of the described technology may further include a second base layer 150, which is adhered to the bottom of the base layer, a second sensor layer 160, which is formed under the second base layer 150 and in which the strain unit 10 and an electrode pattern 13 are formed, and a second cover layer 170, which covers the second sensor layer 160 to protect the same. When the sensors are provided at opposite sides in the above structure, the two sensors may measure the physical change in an epidermis at the same position, thereby increasing sensing accuracy.

Meanwhile, in manufacturing the sensor layer 100 having a double-sided structure, the sensor layer 100 is formed by forming two sensor layers side by side on a single wide base layer and forming a cover layer thereon, and thereafter, the sensor layer 100 is folded in half such that the bottom surfaces of the two portions of the base layer face each other and are adhered to each other using an adhesive layer 140, thereby forming the sensor layer 100 having a double-sided sensor structure.

As shown in FIG. 7C, the sensor layer 100 according to an embodiment of the described technology may further include at least one bump unit 12, which is formed under the base layer and is disposed between the strain units 10. The bump unit 12, which is formed under the base layer of the sensor layer 100, may be formed on each of opposite sides of the strain unit 10 so as to be spaced a predetermined distance apart from the strain unit 10 in the measurement direction Ax of the strain unit 10.

The bump unit 12, which is located at the inner side In of the sensor layer 100 that comes into contact with an epidermis (i.e. in the direction oriented toward the top surface of the base layer), is disposed beside the strain unit 10 in the measurement direction Ax of the strain unit 10, and the bump unit 12, which is located at the outer side Out of the sensor layer 100 that comes into contact with the band 3 (i.e. in the direction oriented toward the bottom surface of the base layer), forms a space between the outer surface of the sensor layer 100 and the band 3, thereby functioning to provide a sufficient back space in which the strain unit 10 is capable of being deformed. Therefore, when the movement of the epidermis is transmitted to the bump unit 12 located at the inner side In, the bump unit 12 located at the outer side Out may provide a space in which the strain unit 10 is capable of being deformed, thereby improving the sensitivity of the sensor.

Further, the sensor layer 100 according to an embodiment of the described technology may include the strain unit 10 and the bump unit 12. As shown in FIGS. 4A and 4B, the strain unit 10 may include at least one serpentine portion 11 having a bent portion, and the bump unit 12 may be located in the measurement direction Ax of the serpentine portion 11 so as not to overlap the serpentine portion 11.

Furthermore, the strain unit 10 may be configured such that the measurement directions Ax of at least two serpentine portions 11 are perpendicular to each other and such that the at least two serpentine portions 11 are connected in series to each other, and the bump unit 12 may be located at the point at which the measurement directions Ax of the two serpentine portions 11 cross each other at right angles, and may be located so as not to overlap the two serpentine portions 11.

Furthermore, the strain unit 10 may be configured such that multiple serpentine portions 11 having the same measurement direction Ax are connected in series to each other, and the bump unit 12 may be located in the measurement direction Ax of the multiple serpentine portions 11 so as not to overlap the serpentine portions 11.

Owing to the above-described arrangement structure of the strain unit 10 and the bump unit 12, the sensitivity of the hand gesture recognition sensor 4 may be improved, and consequently, the gesture input by a user may be effectively recognized. In addition, the sensor layer 100 having the above-described arrangement structure of the strain unit 10 and the bump unit 12 may improve the gesture recognition rate of the wearable device 1.

Although the described technology has been described in detail with reference to specific embodiments, those embodiments are provided only for illustrative purposes. Therefore, the described technology is not limited to those embodiments, but rather those skilled in the art will appreciate that various modifications, additions and substitutions are possible, without departing from the scope and spirit of the invention as disclosed in the accompanying claims.

Further, simple changes and modifications of the described technology are to be appreciated as being included in the scope and spirit of the invention, and the protection scope of the described technology will be defined by the accompanying claims.

What is claimed is:

1. A hand gesture recognition sensor comprising:
at least one strain unit configured to measure a physical change in an epidermis of a human body; and
at least one bump unit located in a measurement direction of the at least one strain unit so as not to overlap the at least one strain unit, the at least one bump unit configured to amplify the physical change,
wherein the at least one strain unit comprises at least two serpentine portions having bent portions, wherein the at least one strain unit is configured such that measurement directions of the at least two serpentine portions are perpendicular to each other and such that the at least two serpentine portions are connected in series to each other,
wherein the at least one bump unit is located in the measurement directions of the at least two serpentine portions so as not to overlap the at least two serpentine portions, and
wherein the at least one bump unit is located at a point at which the measurement directions of the at least two serpentine portions cross each other at right angles, and is located so as not to overlap the at least two serpentine portions.

2. A sensor layer using a hand gesture recognition sensor, the sensor layer comprising:
a first base layer;
a first sensor layer disposed over the first base layer, at least one first strain unit and a first electrode pattern formed in the first sensor layer, the at least one first strain unit formed on the first base layer to measure a physical change in an epidermis of a human body, the first electrode pattern configured to transmit an electrical signal from the at least one first strain unit;
a first cover layer configured to cover the first sensor layer to protect the first sensor layer;
at least one first bump unit located in a measurement direction of the at least one first strain unit so as not to overlap the at least one first strain unit, the at least one first bump unit configured to amplify the physical change;
a second base layer adhered to a bottom of the first base layer;
a second sensor layer formed under the second base layer, at least one second strain unit and a second electrode pattern are formed in the second sensor layer; and
a second cover layer configured to cover the second sensor layer to protect the second sensor layer.

3. The sensor layer according to claim 2 wherein the at least one first strain unit comprises at least one serpentine portion having a bent portion, and
wherein the at least one first bump unit is located in a measurement direction of the at least one serpentine portion so as not to overlap the at least one serpentine portion.

4. A sensor layer using a hand gesture recognition sensor, the sensor layer comprising:
a first base layer;
a first sensor layer disposed over the first base layer, at least one first strain unit and a first electrode pattern formed in the first sensor layer, the at least one first strain unit formed on the first base layer to measure a physical change in an epidermis of a human body, the first electrode pattern configured to transmit an electrical signal from the at least one first strain unit;
a first cover layer configured to cover the first sensor layer to protect the first sensor layer;
at least one first bump unit located in a measurement direction of the at least one first strain unit so as not to overlap the at least one first strain unit, the at least one first bump unit configured to amplify the physical change;
at least one second bump unit formed under the first base layer; and
at least two second strain units formed under the first base layer, the at least one second bump unit disposed between the at least two second strain units.

* * * * *